United States Patent [19]

Boteler

[11] 4,265,365

[45] May 5, 1981

[54] MOISTURE RESISTANT ELECTRICAL OUTLET BOX

[75] Inventor: William C. Boteler, Northport, N.Y.

[73] Assignee: Slater Electric Inc., Glen Cove, N.Y.

[21] Appl. No.: 98,509

[22] Filed: Nov. 29, 1979

Related U.S. Application Data

[63] Continuation of Ser. No. 900,697, Apr. 28, 1978, abandoned.

[51] Int. Cl.³ .............................................. H02G 3/08
[52] U.S. Cl. ...................................... 220/3.3; 220/3.8; 220/378; 174/53
[58] Field of Search .................. 220/3.8, 3.94, 3.2, 220/3.3, 3.4, 378; 174/53, 54, 55–58

[56] References Cited

U.S. PATENT DOCUMENTS

| | | | |
|---|---|---|---|
| 598,498 | 2/1898 | Close | 220/3.8 |
| 2,047,959 | 7/1936 | Gebhard | 220/378 |
| 2,604,507 | 7/1952 | Tyson | 220/378 |
| 2,611,506 | 9/1952 | Scheer | 220/378 |
| 3,288,910 | 11/1966 | Zerwes | 220/3.94 |
| 3,619,476 | 11/1971 | Rasmussen | 220/3.4 |
| 3,716,815 | 2/1973 | Riches | 220/3.8 |
| 3,770,873 | 11/1973 | Brown | 220/3.2 |
| 3,792,414 | 2/1974 | Smith | 220/3.8 |
| 3,811,004 | 5/1974 | Moore | 174/67 |
| 4,044,909 | 8/1977 | Amsler et al. | 220/3.8 |

*Primary Examiner*—Joseph M. Moy
*Attorney, Agent, or Firm*—Morgan, Finnegan, Pine, Foley & Lee

[57] ABSTRACT

A moisture-proof electrical outlet box includes a backwall with a generally continuous sidewall member upstanding therefrom to define a generally open face at the front edges thereof with a drip rail formed on the sidewall member and surrounding the box. The drip rail is preferably located in front of the front edges of the cable-access ports formed in the sidewall member. Advantageously, a frame-like flange member is formed at the front edges of the sidewall member and adapted to provide a moisture-proof seal with the coverplate. As preferably embodied, the drip rail and the flange member are formed integrally with the sidewall member.

16 Claims, 8 Drawing Figures

MOISTURE RESISTANT ELECTRICAL OUTLET BOX

This is a continuation of application Ser. No. 900,697 filed Apr. 28, 1978, now abandoned.

BACKGROUND AND OBJECTS OF THE INVENTION

The present invention relates generally to housings for such electrical fixtures as convenience outlets, switches and the like, and more particularly to electrical outlet boxes adapted for installation in exterior walls or other locations where repeated exposure to moisture is likely.

In the relatively recent past, the convenience of and requirement for providing electrical outlet receptacles, electrical switches and the like, on the exterior wall of such structures as residences, homes, mobile homes, garages, apartments, certain industrial business buildings, etc. has become well recognized. In order to provide such exteriorly located electrical fixtures, the electrical outlet box which will house the fixture must be installed in a manner to prevent the risk of moisture entering the enclosure.

Currently, exteriorly located electrical fixtures are installed in an outlet box which is first mounted to a supporting stud. The sheathing and the exterior veneer (e.g., brick, stucco, stone-work, shingle, etc.) are attached to the stud, whereafter a suitably proportioned opening is formed in the sheathing and exterior facade to expose the fixture when installed in the box. After the fixture is wired, a coverplate is mounted over the front of the box to seal-off its front edges. In addition, a gasket and/or caulking are usually applied in the space between the back of the coverplate and the outer surface of the exterior facade to prevent moisture from seeping into any gap between the box itself and the opening in the exterior wall.

However, it is very difficult to form a truly water-tight seal at the interface between the back of the coverplate (or the box itself) and the outer surface of the exterior wall adjacent the opening, particularly if the exterior facade has a roughened surface such as stucco, or a porous surface such as brick. In addition, the caulking and/or gasket may fail due to aging or shrinking over time. In either event, moisture may seep past the seal and into the space between the box and the wall opening. The moisture may thence simply flow along an outer surface of the electrical outlet box and leak into the box via the cable-entry ports, wherein it may cause a short circuit or such dangers as are well known in the art.

One approach for overcoming the foregoing disadvantages is to provide sealed conduits leading into and out of the box. The conduits are secured to the box in a moisture-proof manner and an electrical cable can be inserted into the box through the conduits. For example, cast aluminum boxes have been made which have threaded openings formed in sidewall portions so that exteriorly threaded conduits can be attached to the box. However, such structures are significantly more expensive to fabricate than the usual electrical outlet box and require additional materials in the form of the conduits. In addition, time-consuming installation and wiring procedures are required, thereby further increasing the expense of the procedures over those for the usual interior outlet boxes.

Therefore, it is an object of the present invention to provide a new and improved electrical outlet box adapted to provide moisture-proof enclosure for an electrical fixture. Another object of the present invention is to provide a new and improved electrical outlet box adapted to provide moisture-proof enclosure for electrical fixtures, which can be installed in the exterior walls of new structures as well as existing structures.

It is also an object of the present invention to provide a new and improved electrical outlet box adapted to provide moisture-proof enclosure for electrical fixtures which can be made in a unitary or integral structure.

It is another object of the present invention to provide a new and improved electrical outlet box adapted to provide moisture-proof enclosure for electrical fixtures, which can be integrally made from a moldable plastic material.

It is an additional object of the present invention to provide a new and improved electrical outlet box adapted to provide moisture-proof enclosure of an electrical fixture, despite the failure or absence of caulking or the like between the box and opening in the wall.

It is a further object of the present invention to provide a new and improved electrical outlet box adapted to provide moisture-proof enclosure for an electrical fixture, which does not require sealed conduits, or the like, for leading the electrical conductors into or out of the box.

It is yet another object of the present invention to provide a new and improved electrical outlet box adapted to provide moisture-proof enclosure of an electrical fixture, which is substantially simple to install and about as easy to wire as conventional outlet boxes located in the interior walls of a structure and can be easily installed in existing structures as well as structures under construction.

Objects and advantages of the invention are set forth in part above and in part below. In addition, these and other objects and advantages will become apparent herefrom, or may be appreciated by practice with the invention, the same being realized and attained by means of the structures, instrumentalities and combinations pointed out in the appended claims. Accordingly, the present invention resides in the novel parts, constructions, arrangements and improvements, herein shown and described.

SUMMARY OF THE INVENTION

Briefly described, the moisture-proof electrical outlet box according to the present invention includes a generally box-like structure having a backwall with a generally continuous sidewall member upstanding therefrom to define a generally open face at the front edges of the sidewall member, with cable-access port(s) formed in either the sidewall or backwall member to provide access for electrical cables to the interior of the box and deflecting means on the sidewall member, surrounding the box and located in front of the front edges of the cable-access port(s). Advantageously, the deflecting means are formed integrally with the sidewall member and, in a preferred embodiment, the deflecting means comprise a generally frame-like drip rail formed integrally with the sidewall member.

According to another aspect of the invention, flange means are formed along the front edges of the sidewall member, extending parallel to the backwall and providing a suitable opening for access into the box. The flange means are adapted to provide a moisture-proof seal with a coverplate attached at the front of the box. As preferably embodied, the front surface of the flange means is formed with one or more parallel and continuous beadlike projections adapted to coincide with at least a portion of the flange on the back of the cover plate, and the box also includes the aforesaid deflecting means.

Also as preferably embodied, lug members are formed on oppositely disposed portions of the box, inside the perimeter defined by the bead-like projection(s) on the flange means, each lug including a borehole adapted to engage a threaded fastener for retaining an electrical fixture to be mounted to the box. Each borehole is preferably closed or otherwise sealed at its back end. In addition, similar lug members are formed on the box, also within the perimeter defined by the bead-like projection(s) on the flange, for engaging threaded fasteners which will secure a coverplate to the box.

As preferably embodied, the box, flange means and drip rail are integrally formed in a unitary structure, advantageously, from either injection or compression moldable plastic materials.

It will be apparent from the foregoing general description that the objects of the invention specifically enumerated herein are accomplished by the invention as herein disclosed. Thus, it will be found that a moisture-proof electrical outlet box may be constructed according to the present invention, which can be easily installed in an opening formed in an exterior wall of either an existing structure or one under construction to provide a moisture-proof enclosure for an exteriorly accessible electrical outlet, switch or the like.

In addition, it will be found that the moisture-proof electrical outlet box according to the present invention can be installed in an exterior wall and provide an essentially moisture-proof housing for an electrical fixture mounted therein without requiring conduits or other structures for sealing the cable-access port(s) against water.

It will also be found that the moisture-proof electrical outlet box according to the present invention can be integrally made in a unitary structure from a moldable material, particularly a moldable plastic material, in a four-part mold. Moreover, the box can be made in essentially any desired configuration, such as a round, rectangular or multi-gang box.

Also, by providing deflecting means in the form of a frame-like drip rail surrounding the exterior surface of the sidewall member in front of the cable-access port(s), it will be found that any moisture which may seep into the space between the box and the opening in the exterior wall will be prevented from flowing into the box via the cable-access port assemblies. Rather, it will be deflected so as to drip harmlessly off the box. In addition, it will be found that by providing such drip rail, any conventional knockout port, and closure means therefor, can be utilized for providing the cable-access port assemblies.

Moreover, by providing a flange at the front edges of the box and a drip rail as far back on the box as possible yet forward of the front edges of the cable-access port(s), a maximum amount of surface is provided for enabling moisture to accumulate or collect through the thickness of the wall, while ensuring that virtually no moisture can seep into the box. Furthermore, by providing a continuous parallel bead-like projection on the front surface of the flange, the coverplate gasket can be grasped between the projection and at least a portion of the flange, or lip, on the back of the coverplate to ensure a truly completely moisture-proof seal. In addition, by providing two or more continuous bead-like projections, such grasping will be effected when either a horizontally or vertically oriented coverplate is secured to the box, or when the shape of the coverplate flange includes any eccentricity or irregularity.

It will be understood that the foregoing general description as well as the following detailed description are exemplary and explanatory of the invention, but are not restrictive thereof. To this end, the accompanying drawings referred to herein and constituting a part hereof, illustrate a preferred embodiment of the invention and, together with the description, serve to explain the principles of the invention.

DETAILED DESCRIPTION OF A PREFERRED EMBODIMENT

Figure 1:
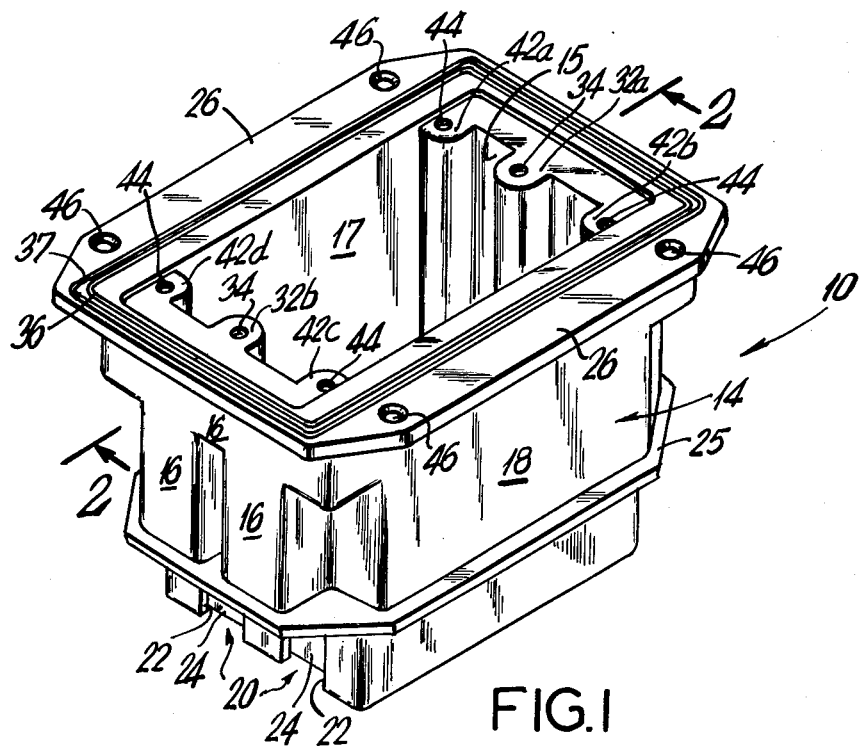
FIG. 1 is a perspective view of an electrical outlet box constructed in accordance with the present invention.
Figure 2:
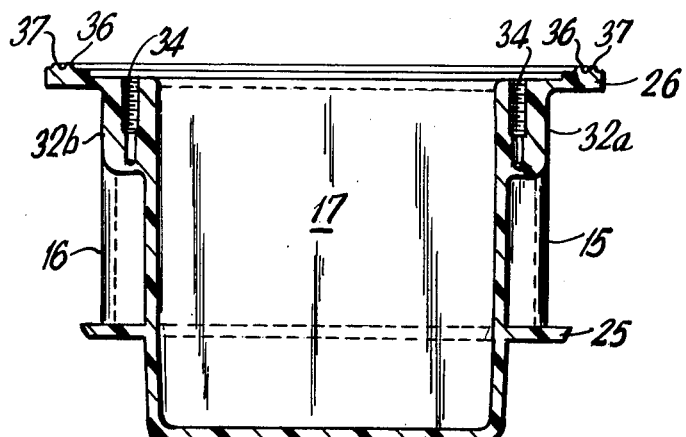
FIG. 2 is a sectional view taken along section 2—2 of FIG. 1.
Figure 3:
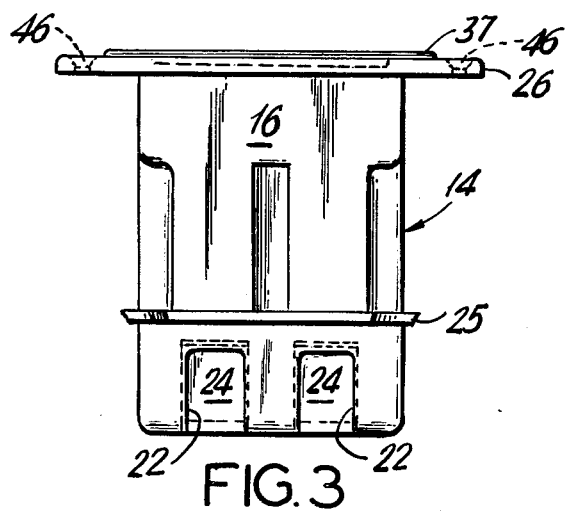
FIG. 3 is an elevation of an end of the outlet box shown in FIG. 1.
Figure 6:
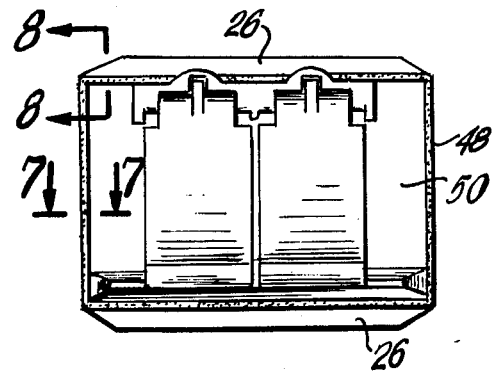
FIG. 6 is a front elevation view of the box of FIG. 1 having a horizontally oriented coverplate.

Referring now generally to the embodiment of the present invention shown in the accompanying drawings, wherein like reference characters refer to like parts throughout the various views, there is illustrated in FIGS. 1-3 various views of a moisture-proof electrical outlet box, indicated generally by reference numeral 10, made in accordance with the present invention.

As here embodied, box 10 includes a generally flat backwall 12 with a continuous sidewall member (indicated generally at 14) upstanding therefrom, which includes a pair of oppositely disposed endwall portions (indicated at 15 and 16) and a pair of oppositely disposed sidewall portions (indicated at 17 and 18). The front edges of endwalls 15 and 16 and sidewalls 17 and 18 preferably define a generally planar open front for box 10. It will be understood that, although box 10 is here illustrated as rectangular, it may be formed in any desired or conventional configuration such as a round box or square box, etc.

Box 10 includes cable-access port assemblies (each indicated generally at 20) formed in sidewall member 14. As here embodied, each assembly 20 comprises a knockout port opening 22 and a knockout closure member in the form of a knockout panel 24 which is removably attached adjacent its corresponding opening 22. Thus, it will be understood that cable-access assemblies 20 may be any conventional knockout window assembly used with interiorly installed outlet boxes, such as disclosed in U.S. Pat. No. 4,007,852 which is assigned to the same assignee as the present application and is hereby incorporated by reference herein.

In accordance with the invention, box 10 is formed with deflecting means on sidewall member 14, completely surrounding the box, for directing any moisture which may fall on or accumulate on wall member 14 away from each cable-access assembly 20 to prevent water from entering box 10 therethrough. As preferably embodied, the deflecting means comprise frame-like drip rail 25 formed on and projecting outwardly from the exterior surface of sidewall member 14, and completely surrounding the box.

Figure 4:
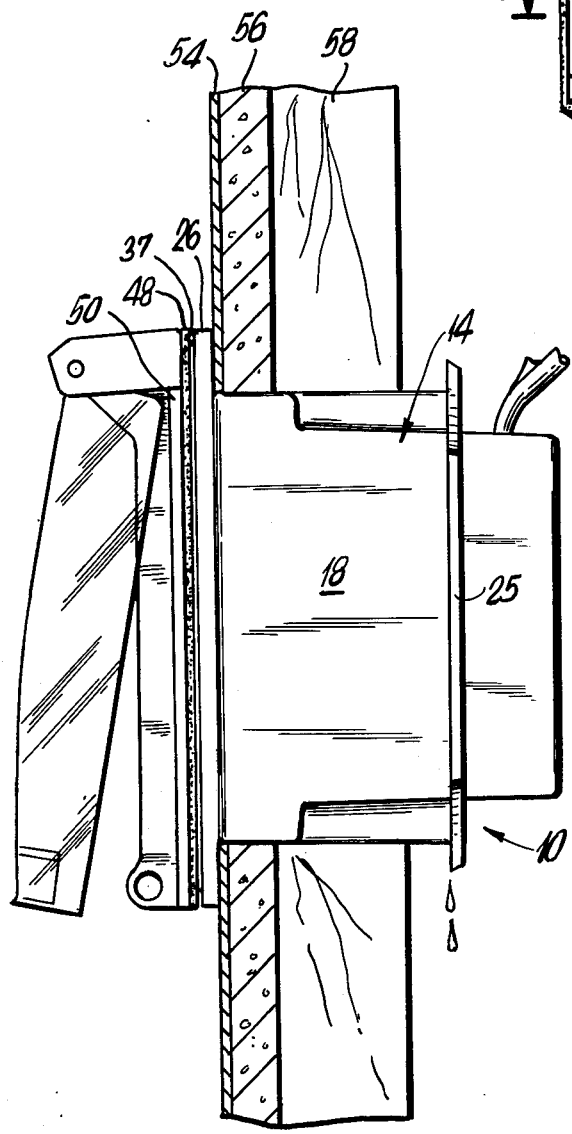
FIG. 4 is a section view through an exterior wall, showing the outlet box of FIG. 1 installed in the wall.

Advantageously, and as here preferably embodied, cable-access assemblies 20 are located on one or both endwall portions, 15 and 16, and extend to backwall 12. Drip rail 25 is preferably located as far back on box 10 as possible, yet forward of the front edges of all the cable-access openings 22, which edges preferably terminate to define an essentially common plane extending parallel to backwall 12. In this way, as much sidewall surface area as possible will be available on which moisture may accumulate, over the thickness of the exterior wall (made up, for example, of exterior facade 54 and sheathing 56 attached to stud 58, as shown in FIG. 4) in which box 10 is mounted. However, the water will be unable to enter box 10 through cable-access assemblies 20 by the presence of drip rail 25.

Also as preferably embodied, drip rail 25 is formed integrally with sidewall member 14. To this end, box 10 and drip rail 25 may be made as an integrally formed unitary structure by a four-part injection mold, using an injection moldable plastic material such as a PVC like that sold under the designation Ethyl-7042 by the Ethyl Corporation or a blend of ABS and PPO like that sold by the General Electric Co. under the tradename "NORYL" SE-100 or SE-1 Grades. However, it will be understood that a four-part compression mold could be used to form box 10 from a compression moldable material.

In use, box 10 is mounted in the opening in the exterior wall and an electrical fixture (i.e., an electrical receptacle or switch, etc.) may be wired and installed in the box as will be explained more fully below. Thereafter, a coverplate is secured to the front of the box to form a water-tight seal along the front edges of the box, so that any moisture which may develop at the wall opening can collect only on the sidewall of the box, to be deflected away from cable-access ports 22 by drip rail 25.

In order to mount the electrical fixture to box 10, the box is provided with means for receiving the mounting fasteners on the fixture. As preferably embodied, box 10 is formed with lug members 32a and 32b, here formed on oppositely disposed endwall portions 15 and 16, respectively. As preferably embodied, each lug 32a and 32b is formed with a borehole (each indicated at 34) adapted to engage a threaded fastener for retaining the electrical fixture mounted to the box. For this purpose, boreholes 34 may be prethreaded, or, if unthreaded, a self-tapping screw may be provided for mounting the fixture to the box. Lugs 32a and 32b are closed, or otherwise sealed, at their back ends, thereby enclosing boreholes 34 to prevent moisture from entering the box through boreholes 34. Thus, it will be understood that lugs 32a and 32b may be adapted to permit mounting by any conventional or desired mounting means while also being adapted to block entry of water through the lugs.

According to another aspect of the invention, box 10 is formed with generally frame-like flange 26 along the front edges of sidewall member 14, extending parallel to the front plane of the box, and, preferably co-planar therewith. In order to enable sealing attachment of the coverplate (indicated at 50 in FIG. 4) to box 10, flange 26 is formed with at least one, and preferably two or more, bead-like projections (two projections are shown in the drawings and indicated at 36 and 37), extending continuously around its front surface.

Figure 7:
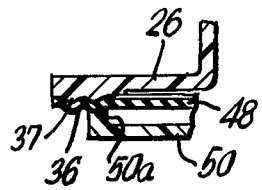
FIG. 7 is a view taken along section 7—7 of FIG. 6.
Figure 8:
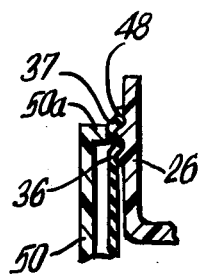
FIG. 8 is a view taken along section 8—8 of FIG. 6.

According to this aspect of the present invention, projections 36 and 37 are proportioned to coincide generally with the lip or flange (indicated at 50a in FIGS. 7 and 8) on the back of coverplate 50, so that the gasket (indicated at 48 in FIGS. 4–8), which is dimensioned to extend slightly beyond the lip of coverplate 50, may be retained between the coverplate flange and one of the projections, as shown in FIGS. 7 and 8. For example, for a single-gang outlet box the outer continuous projection 37 may define a rectangle about 2.82" by about 4.66" (as measured from the outermost surfaces of the bead) and the inner continuous projection 36 may be about 2.66" by about 4.5". In addition, the projections are about 0.050" wide at their base (i.e., where they are attached to flange 26) and about 0.030" high.

It will be found that by having one continuous bead-like projection located within the other, box 10 may be oriented vertically or horizontally to accommodate either a horizontally extending or a vertically extending coverplate. In this way, most, if not all, of lip 50a will coincide with a portion of either projection 36 or 37 to ensure a tight and, therefore, moisture-proof seal between the box and the coverplate, with the gasket therebetween. Although all single-gang coverplates, for example, are rectangular, there may be some slight variations in the length and width of the lip on the back surface thereof. Thus, some of the coverplate lip, 50a, for certain types of coverplates may not coincide completely with a single bead-like projection.

Therefore, it is preferred to form at least two continuous and parallel bead-like projections so that, for example, the coverplate lip may be coincident with outer projection 37 along its long side (FIG. 8), but coincident with inner projection 36 along its short side (FIG. 7). Thus, there is essentially no discontinuity in the sealing co-operation between the bead-like projections and the coverplate lip. The small portions of non-coincidence which might appear at the corners will not detract from the effectiveness of the seal formed therebetween since the gasket will still be grasped between the coverplate lip and the front surface of flange 26 and will be compressed to some extent by the two projections and the coverplate lip.

Figure 5:
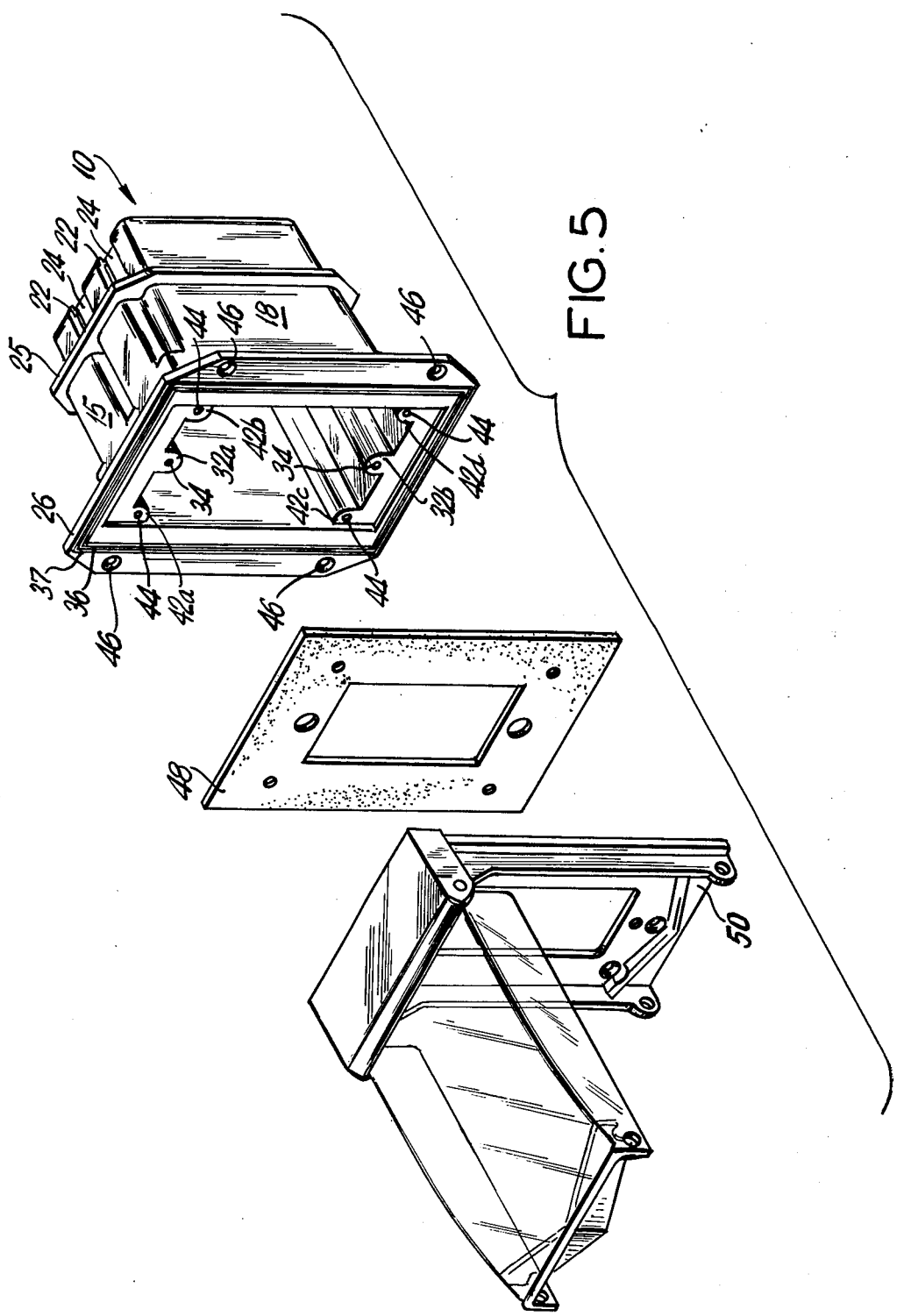
FIG. 5 is an exploded perspective view of the box, gasket and coverplate shown in FIG. 4.

It will be understood that gasket 48 may be any conventional gasket used with watertight coverplates, such as a simple flat sheet of resilient rubber-like material with a cut-out for accommodating the desired fixture, as best shown in FIG. 5.

Box 10 may also include means for enabling a coverplate (here, a four-hole mounting coverplate indicated at 50) to be attached in sealing manner to flange means 26. As here embodied, lug members 42a, 42b, 42c and 42d are formed in the four front corners of box 10, each including a borehole (indicated by reference number 44), similar to borehole 34, which is adapted to engage a threaded fastener for tighteningly securing a coverplate to box 10 with the gasket positioned between flange 26 and coverplate 50. However, as described above with respect to lugs 32a and 32b, lugs 42a–d may be adapted to accommodate any other conventional attachment means for securing the coverplate to flange 26, so long as they are closed at their back ends or otherwise adapted to prevent moisture from entering the box through lugs 42a-d.

Also advantageously, flange means 26 can be formed with means for permitting attachment to the wall in which box 10 is to be mounted. To this end, flange 26 is formed with apertures 46, each adapted to permit insertion of nails (or any other suitable fasteners) which, in turn, are hammered into the exterior wall. As preferably embodied, apertures 46 are located outside the perimeter of outer continuous projection 37 so that moisture cannot seep into the box through such apertures.

Referring then to FIG. 4, box 10, with coverplate 50 attached to the front thereof, is shown installed in an opening in an exterior wall. Thus, it will be seen that even if moisture seeps between the back of flange 26 and the outer surface of outer facade 54, the water will be deflected away from cable-access assemblies 20 by drip rail 25, to fall harmlessly off box 10. Moreover, since a moisture-proof seal is formed by gasket 48 grasped between flange 26 and coverplate 50, no water will leak into box 10 to cause a short circuit in the wiring.

As preferably embodied, any corners formed in the sidewall member 14 are rounded to facilitate drain off of water on the box. In addition, the sidewall portions located between flange 26 and drip rail 25 may be formed with a slightly rearward taper to facilitate rearward flow towards drip rail 25. The taper is preferably uniform over the entire wall member so that it will not matter which side is up.

Those skilled in the art will recognize that changes or modifications may be made in the embodiment described above, without departing from the scope and the spirit of the invention as defined in the appended claims. Thus, for example, although it is preferred to form drip rail 25 and flange means 26 integrally with box 10, one or both may be bonded or otherwise sealingly secured to the sidewall member 14. In addition, box 10 need not be plastic, but can be metal, with drip rail 25 and/or flange means 26 formed integrally therewith (as by cast molding the box from aluminum or aluminum alloy) or welded or otherwise affixed to the box.

Accordingly, the invention in its broader aspects is not limited to the specific embodiment herein shown and described, but variations may be made therefrom within the scope of the accompanying claims, without departing from the principles of the invention and without sacrificing its principal advantages.

What is claimed is:

1. A moisture resistant electrical outlet box which comprises:
    an integral wall structure including a backwall member and a generally continuous sidewall member extending from said backwall to define a chamber in said box and said sidewall providing an opening to said chamber at its front edges, said front edges including a mounting flange member therearound;
    cable-access port means formed in said wall structure adapted to provide access to the chamber in said box for one or more electrical cables; and
    deflecting means formed on said sidewall member, integrally therewith, said deflecting means substantially surrounding said box and being located generally rearward of said mounting flange, yet in front of all said port means, said deflecting means comprising a continuous drip rail projecting outwardly from the exterior surface of said sidewall member around the entire box to prevent any moisture collected on said sidewall member in front of said deflecting means from entering said box through said port means.

2. A box according to claim 1, wherein said drip rail is located substantially adjacent the front edges of all said port means, such that said drip rail is located as far back as possible from the mounting flange member of said box to maximize the surface area of said sidewall over which moisture can collect without risk of entering the box.

3. A box according to claim 2, wherein said mounting flange member is adapted to form a substantially moisture-proof seal with a coverplate attached to the front of the box.

4. A box according to claim 3, wherein said mounting flange member extends generally parallel to said backwall member and is adapted to help locate said box in a suitable opening formed in a structural wall in which said box is to be installed.

5. A box according to claim 4, wherein said drip rail projects essentially perpendicular from said sidewall member.

6. A box according to claim 5, wherein said mounting flange member and said drip rail are formed integrally with said box.

7. A box according to claim 6, which further includes threaded fastener mounting means formed at said front edges, said mounting means adapted to permit mounting of an electrical wiring device to said box and comprising:
    a pair of lug members formed on said sidewall portion, generally opposite each other; and
    a hole formed in each lug member, each said hole being open at its front end but sealed at its back end and adapted to retain a threaded fastener, such that the electrical fixture can be mounted in the box by threaded fasteners threaded into said boreholes.

8. A box according to claim 7, wherein said box is integrally formed from a moldable plastic material.

9. A box according to claim 8, wherein said box is generally rectangular and said sidewall member includes a pair of generally oppositely disposed endwall portions and a pair of generally oppositely disposed sidewall portions, and wherein said cable entry port means are formed on said endwall portions.

10. A box according to claim 8, wherein said box is generally round.

11. A box according to claim 2, wherein all said port means are formed in said sidewall member and terminate generally at said backwall, the front edges of all said port means defining a plane essentially parallel to said backwall.

12. A box according to claims 2, 3 or 7, wherein said sidewall tapers slightly inwardly in the front-to-back direction.

13. An improved outlet box according to claim 11, which further includes at least two essentially parallel bead-like projections formed on the front surface of said flange, said bead-like projections extending continuously around the front surface of said flange and conforming generally to the shape of a coverplate, each said projection being proportioned to coincide at least in part with corresponding portions of the lip on the back of various sized coverplates to be attached to the front edges of the box, such that when a coverplate is secured to the box with a compressible gasket made of resilient material positioned between the front surface of the flange and the back of the coverplate, the gasket can be compressed between various portions of said bead-like projections and the coverplate lip along essentially the entire length of the coverplate lip even though the coverplate lip does not coincide exactly with either of said projections separately.

14. An improved moisture resistant electrical outlet box having a backwall with a generally continuous sidewall member extending therefrom to define a chamber interior of said box and open along the front edges of the sidewall member, wherein the improvement comprises:

a flange formed at the front edges of the sidewall member, said flange extending continuously around the front opening of the box, and a drip rail projecting outwardly from said sidewall member, from its exterior surface, around the entire box, said drip rail being located rearward of said flange to prevent any moisture collecting on said sidewall between said flange and said drip rail from entering the box through port means located rearward of said drip rail.

15. An improved box according to claim 13, wherein said flange includes at least one aperture formed therein and located outside the perimeter defined by said projections, such that said box can be secured to a structural wall by a nail, threaded fastener or the like inserted through each said aperture and into the wall.

16. An improved box according to claim 13 or 15, wherein said flange, said bead-like projections and said drip rail are formed integrally with said box.

* * * * *